United States Patent
Jeon et al.

(10) Patent No.: US 11,126,602 B2
(45) Date of Patent: Sep. 21, 2021

(54) KEY-VALUE STORAGE DEVICE AND OPERATING METHOD THEREOF

(71) Applicant: Samsung Electronics Co., Ltd., Suwon-si (KR)

(72) Inventors: Jekyeom Jeon, Siheung-si (KR); Byung-Ki Lee, Hwaseong-si (KR); YoungHo Park, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 204 days.

(21) Appl. No.: 16/136,544

(22) Filed: Sep. 20, 2018

(65) Prior Publication Data

US 2019/0258729 A1 Aug. 22, 2019

(30) Foreign Application Priority Data

Feb. 22, 2018 (KR) .......................... 10-2018-0021039

(51) Int. Cl.
| | |
|---|---|
| *G06F 7/00* | (2006.01) |
| *G06F 16/00* | (2019.01) |
| *G06F 16/22* | (2019.01) |
| *G06F 3/06* | (2006.01) |
| *G06F 12/02* | (2006.01) |

(52) U.S. Cl.
CPC .......... *G06F 16/221* (2019.01); *G06F 3/0608* (2013.01); *G06F 3/0652* (2013.01); *G06F 3/0679* (2013.01); *G06F 12/0246* (2013.01); *G06F 16/2255* (2019.01); *G06F 2212/7201* (2013.01)

(58) Field of Classification Search
None
See application file for complete search history.

(56) References Cited

U.S. PATENT DOCUMENTS

| | | | |
|---|---|---|---|
| 8,504,758 | B1 | 8/2013 | McHugh et al. |
| 9,015,126 | B2 | 4/2015 | Rambacher et al. |
| 9,075,710 | B2 | 7/2015 | Talagala et al. |
| 9,438,426 | B2 | 9/2016 | Li et al. |
| 9,569,141 | B2* | 2/2017 | Foong .................... G06F 3/0659 |
| 2011/0289052 | A1* | 11/2011 | Rambacher ......... G06F 16/1873 |
| | | | 707/624 |
| 2011/0305335 | A1* | 12/2011 | Negishi ................. H04L 9/3242 |
| | | | 380/255 |
| 2012/0102298 | A1* | 4/2012 | Sengupta ............ G06F 16/2255 |
| | | | 711/216 |

(Continued)

*Primary Examiner* — Tuan A Pham
(74) *Attorney, Agent, or Firm* — Harness Dickey & Pierce, P.L.C.

(57) ABSTRACT

A key-value storage device includes a nonvolatile memory device and a memory controller. The nonvolatile memory device stores a value, a key which is referenced to identify the value, and key age data which are changed based on an erase operation of the value, and the memory controller that receives an erase command directing erasing of the value corresponding to the key from a host, generates hash data, a size of which is smaller than a size of the key, in response to the erase command, and transmits a complete message to the host. The memory controller accesses the key and the key age data stored in the nonvolatile memory device based on the hash data and erases the value based on the accessed key and the accessed key age data during an idle time after the transmission of the complete message.

9 Claims, 11 Drawing Sheets

(56) References Cited

U.S. PATENT DOCUMENTS

| | | | |
|---|---|---|---|
| 2013/0024460 A1* | 1/2013 | Peterson | G06F 3/0679 707/741 |
| 2013/0275656 A1* | 10/2013 | Talagala | G06F 12/0246 711/103 |
| 2015/0134602 A1 | 5/2015 | Nicholas et al. | |
| 2016/0099810 A1* | 4/2016 | Li | G11C 15/00 713/193 |
| 2017/0160989 A1 | 6/2017 | Hsieh et al. | |

* cited by examiner

FIG. 6

| Target Key Data | Page Start Data | Page End Data | Target Key Age Data |
|---|---|---|---|

KEY-VALUE STORAGE DEVICE AND OPERATING METHOD THEREOF

CROSS-REFERENCE TO RELATED APPLICATIONS

This application claims priority under 35 U.S.C. § 119 to Korean Patent Application No. 10-2018-0021039 filed on Feb. 22, 2018, in the Korean Intellectual Property Office, the disclosure of which is incorporated by reference herein in its entirety.

BACKGROUND

Example embodiments of the inventive concepts disclosed herein relate to a storage device and/or an operating method thereof. For example, at least some example embodiments relate to a key-value storage device and an operating method thereof.

Various electronic devices which store data and operate based on the stored data are being used. The electronic devices may include a storage device or a storage system for storing data. Alternatively, the electronic devices may store or read data while communicating with an external storage device or storage system. The storage device or system may be classified into nonvolatile memory based storage and volatile memory based storage. The nonvolatile memory based storage may store data regardless of power supply.

The storage device or system may be classified into block based storage and object or key-value based storage. The block based storage may manage data based on a physical location, and the object or key-value based storage may manage data based on a unique identifier or key. The key-value storage may be efficient in the case where the amount of unstructured data such as a video and an image is great.

Nowadays, as the use of the unstructured data increases, demand for efficient management of unstructured data may increase. Also, there is a need to efficiently perform various operations in the key-value based storage device or system which is advantageous to manage the unstructured data.

SUMMARY

Example embodiments of the inventive concepts provide a key-value storage device which secures efficiency of an erase operation and reduces a latency and/or an operating method thereof.

According to an example embodiment, a key-value storage device includes a nonvolatile memory device configured to store a value, a key, and key age data, the key identifying the value, and the key age data varying based on an erase operation of the value; and a memory controller configured to, receive an erase command directing erasing of the value corresponding to the key from a host, generate hash data in response to the erase command such that a size of the hash data is smaller than a size of the key, transmit a complete message to the host, access the key and the key age data stored in the nonvolatile memory device based on the hash data, and erase the value based on the key and the key age data during an idle time after transmission of the complete message.

According to an example embodiment, a key-value storage device includes a nonvolatile memory device configured to store a value and a key, the key identifying the value; and a memory controller configured to, add key age data to metadata, the key age data being generated based on a write operation of data stored in a memory area corresponding to the key, and write, to the nonvolatile memory, the value, the key, and the metadata including the key age data.

According to an example embodiment, an operating method of a key-value storage device includes receiving a value and a key from a host, the key identifying the value; generating key age data such that the key age data varies in response to an erase operation of the value; writing the value, the key, and the key age data in a nonvolatile memory device; reading the key and the key age data from the nonvolatile memory device in response to an erase command received from the host; and erasing the value based on the key and the key age data.

BRIEF DESCRIPTION OF THE DRAWINGS

The above and other objects and features of the inventive concepts will become apparent by describing in detail some example embodiments thereof with reference to the accompanying drawings.

FIG. 6 is a diagram illustrating a format of erase information data of FIG. 5.

DETAILED DESCRIPTION

Below, some example embodiments of the inventive concepts will be described clearly and in detail with reference to accompanying drawings to such an extent that an ordinary one in the art implements example embodiments.

Figure 1:
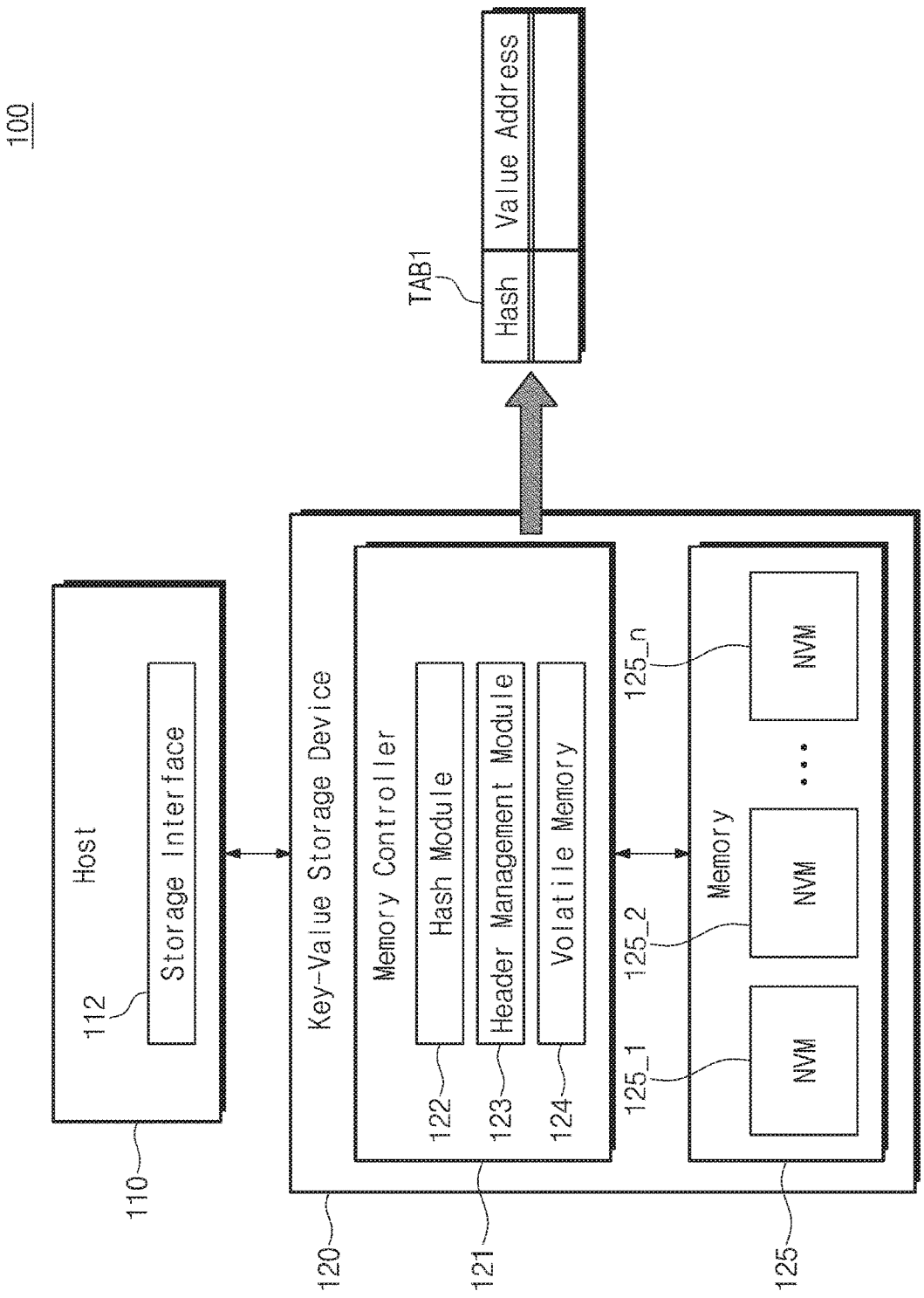
FIG. 1 is a block diagram of an electronic system according to an example embodiment of the inventive concepts.

FIG. 1 is a block diagram of an electronic system according to an example embodiment of the inventive concepts. Referring to FIG. 1, an electronic system 100 includes a host 110 and a key-value storage device 120. The host 110 and the key-value storage device 120 may store and manage data while communicating with each other. The host 110 and the single key-value storage device 120 are illustrated in FIG. 1 as communicating with each other. However, the inventive concepts are not limited thereto. For example, a plurality of hosts and a plurality of key-value storage devices may communicate with each other, either directly or via an intermediate device. The electronic system 100 may be, but is not limited to, an electronic device such as a personal computer, a notebook, a mobile phone, personal digital assistant (PDA), or a camera.

The host 110 may perform various operations for executing an application depending on a command received from a user. To this end, the host 110 may include a plurality of application modules. The host 110 may include a dedicated logic circuit, such as a field programmable gate array (FPGA) or application specific integrated chips (ASICs), for the purpose of performing various operations. The host 110 may request the key-value storage device 120 to perform various operations.

The host 110 may generate key-value data. To store data in the key-value storage device 120, the host 110 may output the key-value data to the key-value storage device 120. The key-value data may include a key, a value, and metadata. The value may correspond to data to be stored in the key-value storage device 120. The key may be data to be referenced to identify the value. The metadata may include information about the key and the value. For example, the metadata may include the size of the key, the size of the value, etc., which will be described later.

The host 110 may include a storage interface 112 for an interface with the key-value storage device 120. The key-value data may be provided to the key-value storage device 120 through the storage interface 112. In the key-value based electronic system 100, the storage interface 112 may not translate a key to a logical block address, unlike a block based electronic system. The electronic system 100 may perform various operations associated with the key-value storage device 120 by using the key-value data itself. Accordingly, the electronic system 100 of FIG. 1 may reduce overhead due to the translation of the key to the logical block address. However, since the key generated in the host 110 needs a relatively large storage space compared with a block address, a structure of the key-value storage device 120 for overcoming a limitation on a storage space will be described later.

The key-value storage device 120 may include a memory controller 121 and a memory 125.

The memory controller 121 may manage and control operations of the memory 125 in response to a request from the host 110. The memory controller 121 may include a dedicated logic circuit (e.g., FPGA or ASICs) which performs an arithmetic operation or a logical operation for managing and controlling operations of the memory 125. The memory controller 121 may receive various commands and data from the host 110 for the purpose of performing various operations. For example, the memory controller 121 may receive a write command and key-value data from the host 110 for the purpose of performing a write operation of the memory 125. For example, the memory controller 121 may receive an erase command and key-value data from the host 110 for the purpose of performing an erase operation of the memory 125.

The memory controller 121 may include a hash module 122, a header management module 123, and a volatile memory 124.

The hash module 122 may perform a hash operation on the key received from the host 110. The hash module 122 may generate hash data as a result of the hash operation. The hash operation may mean changing the size of specific data to a smaller size. That is, the hash module 122 may be adopted to reduce a length of the key. In the case where the length of the key received from the host 110 is long, a larger memory area is required to store the key. The hash module 122 generates hash data, the size of which is smaller than that of the key, through the hash operation. The key-value storage device 120 may write, erase, or read data based on the hash data. In this case, a latency due to various operations of the key-value storage device 120 may decrease.

The header management module 123 may manage metadata. The header management module 123 may change or translate the metadata received from the host 110. The metadata changed or translated by the header management module 123 may be stored in the memory 125.

The header management module 123 may add key age data to the metadata. In the write operation of the key-value storage device 120, the memory controller 121 may store the metadata in the memory 125 together with the key and the value after adding the key age data to the metadata. The key age data may be used as a reference for determining whether data in a memory area are actually erased or are not erased. The key age data may be provided to secure the stability associated with the erase operation of data stored in the memory 125. The key age data may be generated or changed based on the write operation of the value. The key age data may be changed based on the erase operation of the value. However, the inventive concepts are not limited thereto. For example, the key age data may be generated and changed in various schemes. For example, the key age data may be generated or changed based on the number of times that the value is written or erased.

In detail, in the case where the memory controller 121 receives an erase command from the host 110, the memory controller 121 may transmit a complete message to the host 110 before data stored in the memory 125 are actually erased. In this case, in the case where sudden power-off occurs after the complete message is transmitted, a portion of data stored in the memory 125 may not be actually erased. The header management module 123 may generate the key age data, and may change a key age data value corresponding to the key-value data as an erase operation is performed. Accordingly, a memory area in which data are erased may be identified.

The volatile memory 124 may be configured to store various processed or result data generated in management and control operations of the memory controller 121. For example, an operation command received from the host 110, hash data generated according to a hash operation, and data generated to perform the write, erase, or read operation of the memory 125 may be stored in the volatile memory 124. The volatile memory 124 may be, but is not limited to, a dynamic random access memory (DRAM) or a synchronous DRAM (SDRAM). The volatile memory 124 is illustrated in FIG. 1 as being disposed inside the memory controller 121. However, the inventive concepts are not limited thereto. For example, the volatile memory 124 may be disposed outside the memory controller 121.

The memory controller 121 may generate mapping information for the purpose of performing various operations of the key-value storage device 120 such as a write operation, an erase operation, or a read operation. The memory controller 121 may obtain a physical address of the memory 125 by using a flash translation layer (not illustrated). For example, the flash translation layer (not illustrated) which is loaded onto the volatile memory 124 and is driven by the memory controller 121 may obtain a physical address (e.g., a value address) based on the hash data.

The memory controller 121 may manage the mapping information. The memory controller 121 may manage the mapping information in the form of a mapping table TAB1. However, the inventive concepts are not limited thereto. For example, the memory controller 121 may manage the mapping information in various schemes. Referring to the mapping table TAB1, the mapping information may be information about a correspondence relationship between the hash data, which is generated based on the key, and the value. The mapping information may indicate an address of the memory 125, at which the value corresponding to the hash data is stored. An access to the key-value data stored in the memory 125 may be performed by the memory controller 121 based on the mapping information.

The memory 125 may include a plurality of nonvolatile memory devices 125_1 to 125_n in which the key-value data are stored. The plurality of nonvolatile memory devices 125_1 to 125_n may be, but is not limited to, a NAND flash memory. Since there is a limitation in storing all keys in a volatile memory such as a DRAM depending on the size of the key, the key-value data may be stored in the memory 125 in the form of a key-value pair.

The memory 125 may perform various operations requested from the host 110 under control or management of the memory controller 121. For example, data provided from the host 110 may be stored in the memory 125, data in the memory 125 may be erased, or data may be read from the memory 125. Each of the plurality of nonvolatile memory devices 125_1 to 125_n may include a memory cell array which includes a plurality of memory blocks. Each of the memory blocks may include a plurality of pages. Data may be written or read for each page and may be erased for each memory block.

Figure 2:
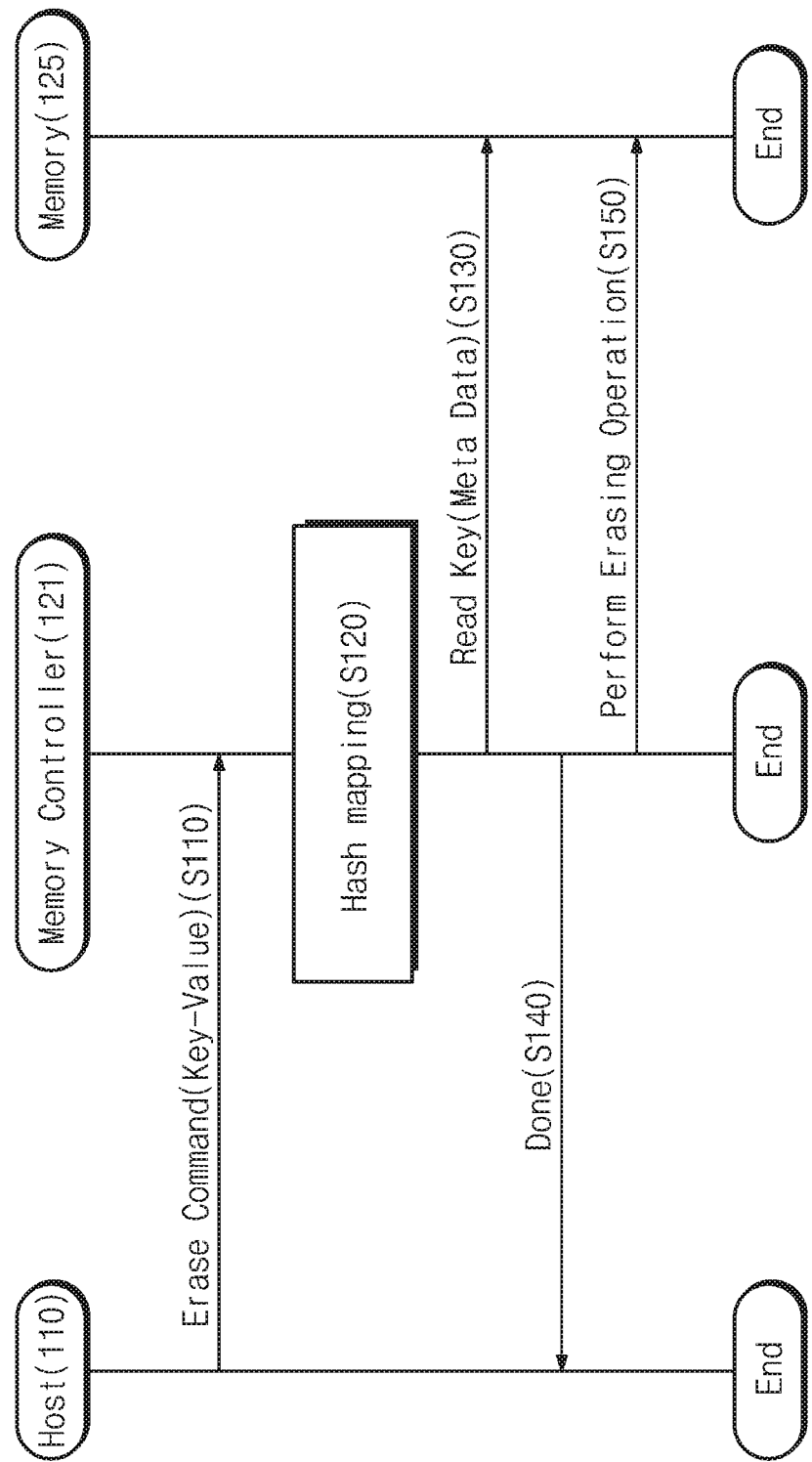
FIG. 2 is a flowchart for describing an erase operation in an electronic system of FIG. 1.

FIG. 2 is a flowchart for describing an erase operation in an electronic system of FIG. 1. An erase operation of FIG. 2 may be performed in the host 110, the memory controller 121, and the memory 125 included in the electronic system 100 of FIG. 1. For convenience of description, FIG. 2 will be described with reference to reference marks of FIG. 1.

Referring to FIGS. 1 and 2, in operation S110, the host 110 may provide an erase command to the memory controller 121. The erase command may be information directing erasing of a target value corresponding to a target key. Here, the target key may be a key, which is included in key-value data targeted for the erase operation, from among a plurality of different keys. The target value may mean a value targeted for the erase operation among a plurality of different values. The host 110 may provide the target key to the memory controller 121. Since there is no need for the host 110 to perform translation to a logical block address for the target key, the overhead of the host 110 may be reduced.

In operation S120, the memory controller 121 may perform a hash mapping operation. The hash mapping operation may be performed based on mapping information managed by the memory controller 121. To perform the hash mapping operation, the memory controller 121 may perform a hash operation on the received target key. The hash operation may be performed by the hash module 122, and target hash data may be generated as a result of the hash operation. The memory controller 121 may extract an address of a memory area, in which a value corresponding to the target hash data is stored, based on the mapping information.

In operation S130, the memory controller 121 may perform a read operation associated with the key or the key-value data, on the memory 125. The address extracted by the hash mapping operation may be different from an address of a memory area where the target value is stored. Since hash data, the size of which is smaller than that of a key, are generated in the process of performing the hash operation, different keys may be translated to the same hash data through the hash operation. That is, a memory area storing a key having a different value from the target key which the host 110 actually provides, may be accessed. Accordingly, the memory controller 121 may detect a location where the target value is actually stored, by requesting a read operation from the memory 125.

In operation S130, the memory controller 121 may further read metadata corresponding to the key. The memory controller 121 may read key age data included in the metadata. The header management module 123 may determine a target key age data value to be erased and may detect the same key age data as the target key age data.

In operation S140, the memory controller 121 may provide a complete message to the host 110 in response to the erase command. The host 110 may recognize that the erase operation of the key-value storage device 120 is completed, based on the complete message. After operation S140, an idle time may progress, and the target value stored in the memory 125 may be erased during the idle time. In this case, a latency due to the erase operation may be uniformly maintained regardless of the size of the target value.

In operation S150, the memory controller 121 may perform an erase (or erasing) operation on the memory 125. The memory controller 121 may control the memory 125 such that data are erased based on a location of the target value specified by a result of reading the key in operation S130. Also, the memory controller 121 may control the memory 125 such that data are erased based on the target key age data.

Figure 3:
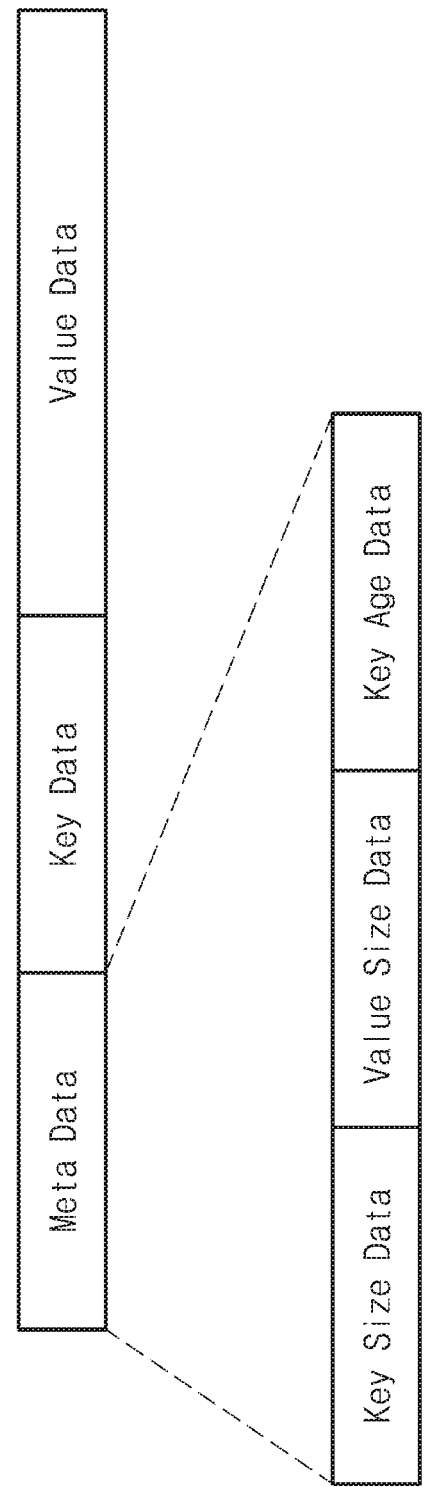
FIG. 3 is a diagram illustrating a format of key-value data of FIGS. 1 and 2.

FIG. 3 is a diagram illustrating a format of key-value data of FIGS. 1 and 2.

Referring to FIGS. 1 and 3, the key-value data of FIG. 3 may be understood as key-value data stored in the memory 125 of FIG. 1. For example, in a write operation of the key-value data, the memory controller 121 may add key age data to the key-value data, and the key-value data to which the key age data are added may be stored in the memory 125. That is, the key-value data stored in the memory 125 may be different from key-value data provided from the host 110. For convenience of description, FIG. 3 will be described with reference to reference marks of FIG. 1.

The key-value data include metadata, a key (key data), and a value (value data). As described above, the value may correspond to a kind of write data to be stored in the key-value storage device 120, and the key may be data to be referenced to identify the value. The metadata include key size data, value size data, and key age data.

The key size data include information about the size of the key. The key may include a character string including one or more numbers, bit values, or characters or a combination thereof. The key size data include information about a length of the character string. The key size data may be used upon detecting the key from the key-value data. The key size data may be included in the key-value data provided from the host 110, but the inventive concepts are not limited thereto.

The value size data include information about the size of the value. The value may include a character string including one or more numbers, bit values, or characters or a combination thereof. The value size data include information about a length of the character string. The value size data may be used upon detecting the value from the key-value data. The value size data may be included in the key-value data provided from the host 110, but the inventive concepts are not limited thereto.

The key size data or the value size data may be used to compare a page size of the memory 125 and the size of the key-value data in a write, read, or erase operation of the key-value storage device 120. For example, in the case where the size of the value is greater than a reference size in the write operation of the key-value storage device 120, the key-value data may be divided and written in a plurality of pages. Here, the reference size may be a size which corresponds to a value obtained by subtracting the size of the metadata from a page size. Also, a memory area in which key-value data are stored may be detected based on the key size data and the value size data, and the read or erase operation may be performed based on the detected memory area.

The key age data may be generated based on the write operation of the value. At this time, a memory area corresponding to the key may be allocated. In this case, a data value of key age data corresponding to a memory area in which a value is present may be different from a data value of key age data corresponding to a memory area from which a value is absent. However, in the case where a value corresponding to a key is additionally appended, the value corresponding to key age data corresponding to the additionally appended value may be changed.

The key age data may be changed based on the write operation or the erase operation of the value. In an example embodiment, the data value of the key age data may be determined based on the number of times that the value is written or erased, but the inventive concepts are not limited thereto. When the value corresponding to the key age data is erased, a key age data value may be changed. The key age data may be generated by the header management module 123 of the memory controller 121, and may be added to the metadata of the key-value data received from the host 110.

Whether the value is actually erased in the erase operation may be determined based on the key age data. As described with reference to FIG. 2, to reduce a latency, an actual erase operation of data stored in the memory 125 may be performed during an idle time after a complete message is transmitted to the host 110. However, in the case where the sudden power-off occurs, data stored in some of a plurality of pages in which the key-value data are stored may not be erased. An actually erased page and a non-erased page may be distinguished based on the key age data.

In detail, in the case where the size of the value is greater than the reference size, the value may be divided and stored in a plurality of pages. The reference size may be set to an upper limit of the size of the value capable of being stored in one page. The metadata, the key, and the divided value may be stored in each of a plurality of pages. That is, the same key age data and the same key may be stored in each of the plurality of pages.

Afterwards, the key age data stored in the actually erased page and the key age data stored in the actually non-erased page may be different in the case where the erase operation progresses and the sudden power-off occurs. This is because the key age data are changed as the value stored in the corresponding page is erased. In this case, the value stored in the actually non-erased page may be erased at power-on. Alternatively, when the write operation is performed in a NAND flash memory in which overwrite is impossible, a non-erased page may be determined, and the write operation may be performed after erasing the value stored in the corresponding page.

Figure 4:
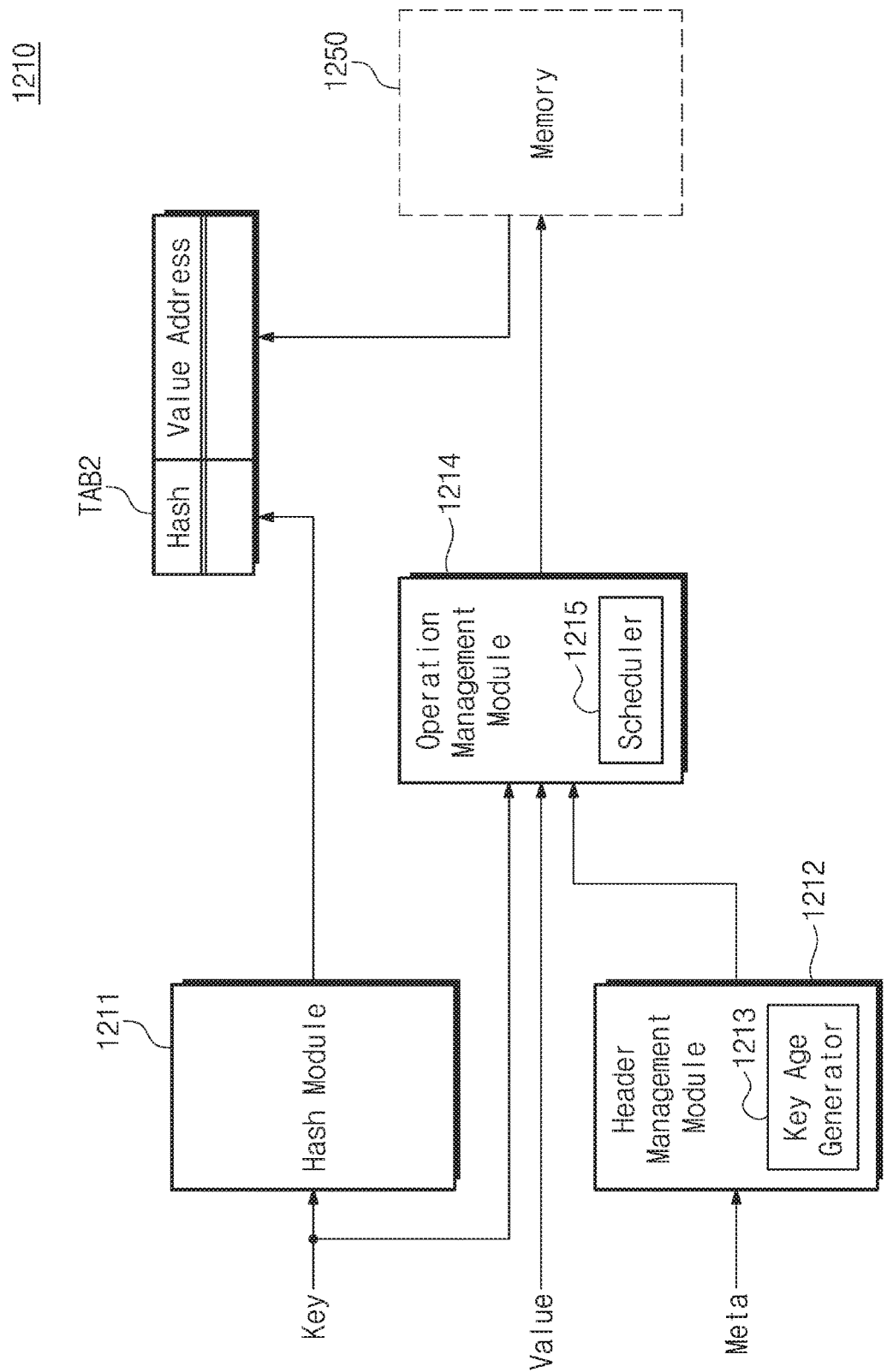
FIG. 4 is a block diagram illustrating an example configuration in which a memory controller of FIG. 1 performs a write operation of key-value data.

FIG. 4 is a block diagram illustrating an example configuration in which a memory controller of FIG. 1 performs a write operation of key-value data. A configuration of FIG. 4 may be understood as an example configuration for describing a write operation of a memory controller 1210, and the memory controller 121 of FIG. 1 is not limited to the configuration of FIG. 4.

Referring to FIG. 4, the memory controller 1210 may include a hash module 1211, a header management module 1212, and an operation management module 1214. For convenience of description, FIG. 4 will be described with reference to reference marks of FIG. 1.

The hash module 1211 generates hash data based on a key "Key". The hash module 1211 performs a hash operation on the key "Key" to generate the hash data, the size of which is smaller than the size of the key. The hash data may be included in mapping information being managed in the form of a mapping table TAB2. The hash module 1211 may have substantially the same configuration and function as the hash module 122 of FIG. 1.

The memory controller 1210 may implement the hash module 1211 using firmware or software. In this case, the hash module 1211 may be loaded onto the volatile memory 124 of FIG. 1 and may be driven by the memory controller 1210 as firmware or software. Alternatively, the memory controller 1210 may implement the hash module 1211 with hardware. In this case, the hash module 1211 may be implemented with a dedicated logic circuit (e.g., FPGA or ASICs) for generating or changing key age data.

The header management module 1212 may add key age data to metadata. The header management module 1212 may receive the metadata from the host 110. The header management module 1212 may include a key age generator 1213 for generating the key age data. The header management module 1212 may provide the operation management module 1214 with the metadata to which the key age data are added. In addition, the header management module 1212 may change the key age data based on an erase operation of a memory area in which a value is stored. The header management module 1212 may have substantially the same configuration and function as the header management module 123 of FIG. 1.

The memory controller 1210 may implement the header management module 1212 by firmware or software. In this case, the header management module 1212 may be loaded onto the volatile memory 124 of FIG. 1 and may be driven by the memory controller 1210 as firmware or software. Alternatively, the memory controller 1210 may implement the header management module 1212 with hardware. In this case, the header management module 1212 may be implemented with a dedicated logic circuit (e.g., FPGA or ASICs) for generating or changing key age data.

The key age generator 1213 may generate the key age data based on the number of times that an erase operation or a write operation is performed on a memory area in which the value corresponding to the key age data is stored. To this end, the key age generator 1213 may receive the key age data corresponding to the key "Key" from a memory 1250 before the written operation is performed. The key age generator 1213 may generate the key age data to be added to the metadata, based on the key age data received from the memory 125. In the case where the memory area includes a plurality of pages and pieces of key age data stored in the plurality of pages are different from each other, that a page, the data of which are not erased due to the sudden power-off or the like, exists may be determined. In this case, the memory controller 1210 may perform the write operation of the key-value data after controlling the memory 1250 so as to erase the value stored in a page where data are not erased.

The operation management module 1214 manages a write operation of the key "Key", a value "Value", and the metadata to which the key age data are added. The operation management module 1214 may allocate a memory area in which the key-value data will be stored. Here, the key-value data may include a key, a value, and key age data. The operation management module 1214 may control the memory 1250 such that the key-value data are stored in the allocated memory area.

The memory controller 1210 may implement the operation management module 1214 by firmware or software. In this case, the operation management module 1214 may be loaded onto the volatile memory 124 of FIG. 1 and may be driven by the memory controller 1210 as firmware or software. Alternatively, the memory controller 1210 may implement the operation management module 1214 with hardware. In this case, the operation management module 1214 may be implemented with a dedicated logic circuit (e.g., FPGA or ASICs) for performing a write operation of the key-value data.

The operation management module 1214 may divide the value "Value" depending on the size of the value "Value" and may store the divided segments of the value "Value" in a plurality of pages of the memory 1250. To this end, the operation management module 1214 may include an allocator (not illustrated). The operation management module 1214 may compare the size of the value "Value" and the reference size. To this end, the operation management module 1214 may refer to the value size data and the key size data included in the metadata. A result which is obtained by subtracting the size of the key and the size of the metadata from the page size of the memory 1250 may be set as the reference size. In the case where the value size is larger than the reference size, the operation management module 1214 may divide the value "Value" to generate a plurality of divided values.

Information about an address of a memory area where the key "Key", the divided value, and the key age data are stored may be included in mapping information managed in the form of the mapping table TAB2. Afterwards, the mapping table TAB2 may be referenced upon performing various operations such as an erase operation and a read operation. The mapping table TAB2 may be stored in the volatile memory 124 of FIG. 1.

The operation management module 1214 may include a scheduler 1215 for allocating a time needed to write a key, a value, and metadata. The scheduler 1215 may control a time to write data in the memory 1250. The scheduler 1215 may determine whether any other processing operation exists, may decide priorities, and may allocate a time to perform a write operation. For example, any other processing operation may include a write, read, or erase operation of the memory 1250 previously requested.

Figure 5:
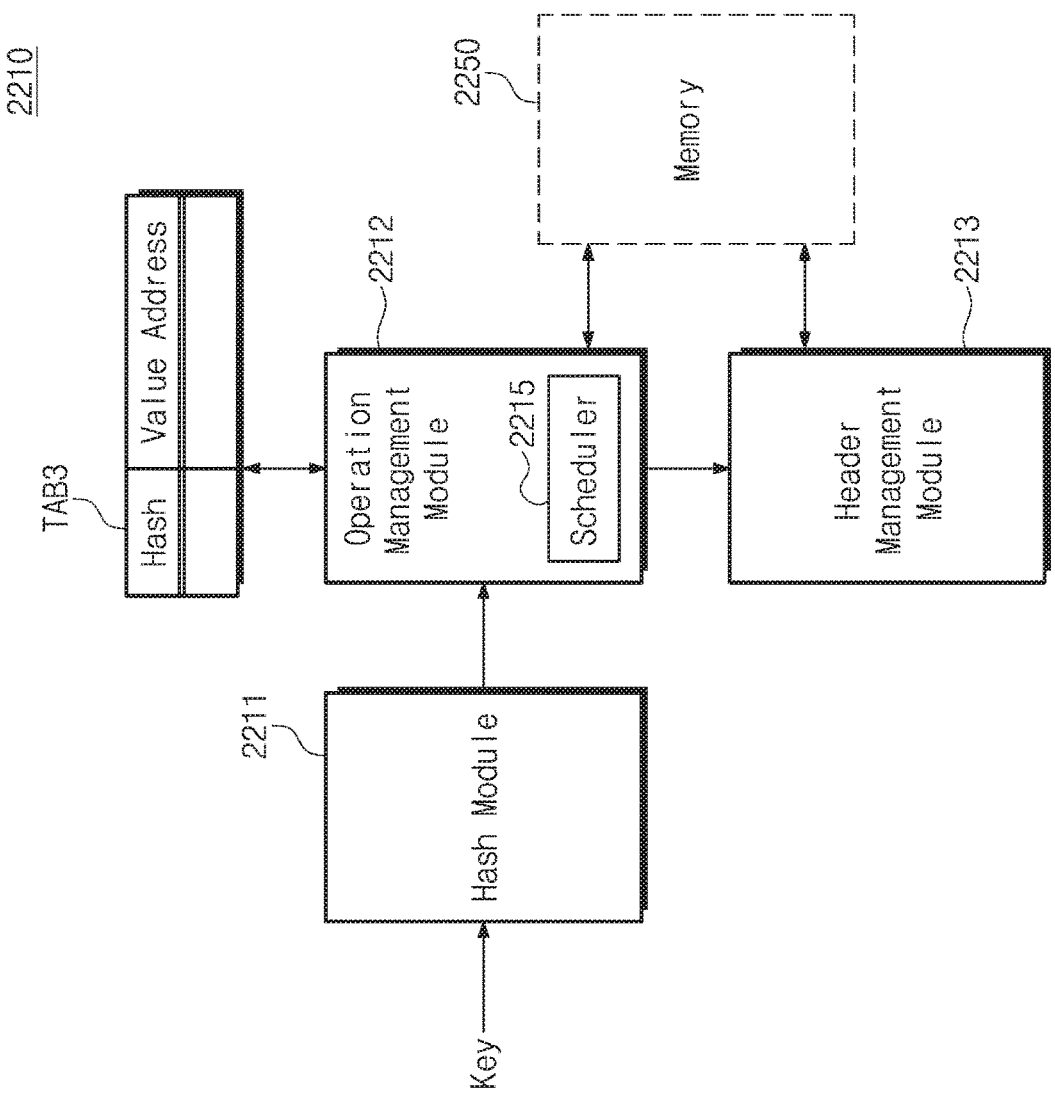
FIG. 5 is a block diagram illustrating an example configuration in which a memory controller of FIG. 1 performs an erase operation of key-value data.

FIG. 5 is a block diagram illustrating an example configuration in which a memory controller of FIG. 1 performs an erase operation of key-value data. A configuration of FIG. 5 may be understood as an example configuration for describing an erase operation of a memory controller 2210, and the memory controller 121 of FIG. 1 is not limited to the configuration of FIG. 5.

Referring to FIG. 5, the memory controller 2210 may include a hash module 2211, an operation management module 2212, and a header management module 2213. For convenience of description, FIG. 5 will be described with reference to reference marks of FIG. 1.

The hash module 2211 receives a key "Key" from the host 110 and generates target hash data based on the key "Key". Here, the key "Key" may be regarded as a target key corresponding to a target value. The hash module 2211 generates hash data, the size of which is smaller than the size of the key "Key". The hash module 2211 may correspond to the hash module 122 of FIG. 1 or the hash module 1211 of FIG. 4.

The operation management module 2212 may manage a read operation accompanied in an erase operation. The operation management module 2212 may extract key age data and a key, which have the same data value of the key "Key", from a memory 2250 based on mapping information managed in the form of a mapping table TAB3. The operation management module 2212 may receive target hash data from the hash module 2211. The operation management module 2212 may determine a memory area targeted for the read operation, with reference to hash data being managed in the mapping table TAB3.

The operation management module 2212 may extract hash data, which have the same data value as the target hash data, and a value address, based on the mapping table TAB3. Here, the value address may mean an address of a memory area in which a value corresponding to the hash data is stored. However, as described with reference to FIG. 2, the value address may not directly mean an address of a memory area in which a value corresponding to the key "Key" is stored.

The operation management module 2212 may receive a key and key age data corresponding to the value address. The received key and key age data may include a plurality of keys and a plurality of key age data provided from a plurality of pages. The operation management module 2212 may extract a key, which has the same data value as the key "Key" received from the host 110, from among the plurality of keys. The operation management module 2212 may extract key age data corresponding to the extracted key. That is, in the erase operation of data, data stored in a memory area corresponding to the extracted key and the extracted key age data may be erased.

After the read operation, the operation management module 2212 may perform the erase operation based on the extracted key and key age data. The operation management module 2212 may determine a memory area to be erased, based on a value address corresponding to the extracted key. The memory area to be erased may include a plurality of pages. In this case, the operation management module 2212 may generate erase information data. The erase information data may include information about a range of pages to be erased and information about key age data. The operation management module 2212 may control a memory 2250 based on the generated erase information data, so as to erase a value or key-value data stored in the plurality of pages.

The memory controller 2210 may implement the operation management module 2212 by firmware or software. In this case, the operation management module 2212 may be loaded onto the volatile memory 124 of FIG. 1 and may be driven by the memory controller 2210 as firmware or software. Alternatively, the memory controller 2210 may implement the operation management module 2212 with hardware. In this case, the operation management module 2212 may be implemented with a dedicated logic circuit (e.g., FPGA or ASICs) for performing an erase operation for key-value data and a read operation for the erase operation.

The operation management module 2212 may include a scheduler 2215 for allocating a time (e.g., an erase operation time) to erase a value or key-value data. The scheduler 2215 may control a time to erase data stored in the memory 2250, in response to an erase command. For the erase operation, the scheduler 2215 may control a time (e.g., a read operation time) needed to read a key and key age data stored in the memory 2250. The scheduler 2215 may allocate the read operation time such that the read operation is performed after a complete message is transmitted to the host 110 of FIG. 1, but the inventive concepts are not limited thereto.

After the key and the key age data are read, the scheduler 2215 may allocate the erase operation time associated with the value or the key-value data stored in the memory 2250. The scheduler 1215 may determine whether any other processing operation previously requested, such as a write operation, a read operation, or an erase operation, exists, may determine priorities, and may allocate the erase operation time.

The header management module 2213 may change a value of the key age data corresponding to the erased page. As such, an actually erased page and a non-erased page may be distinguished. The header management module 2213 may determine a value of key age data to be changed. For example, the header management module 2213 may determine a value of key age data, based on the number of times that a page is erased. In this case, the header management module 2213 may include a counter for counting the number of times that a page is erased. The header management module 2213 may correspond to the header management module 123 of FIG. 1 or the header management module 1212 of FIG. 4.

FIG. 6 is a diagram illustrating a format of erase information data of FIG. 5. Erase information data of FIG. 6 may be understood as erase information data generated by the memory controller 2210 of FIG. 5. However, the erase information data may not be limited to a format of FIG. 6 and may be provided in various formats. For convenience of description, FIG. 6 will be described with reference to reference marks of FIG. 5.

The erase information data may include a target key data, page start data, page end data, and target key age data. The target key data may be defined as a key corresponding to a target value to be erased. That is, the target key data may have the same data value as a key received from a host in an erase operation. The memory controller 2210 may control the memory 2250 to erase a value or key-value data corresponding to the target key.

The page start data and the page end data may be defined by using page range data indicating a range of pages to be erased. That is, the memory controller 1210 may control the memory 2250 such that a value or key-value data stored in a start page corresponding to the page start data, an end page corresponding to the page end data, and a page(s) between the start page and the end page. For example, the page start data and the page end data may be generated as the memory controller 2210 extracts all pages corresponding to the target key. Alternatively, the page start data and the page end data may be generated with reference to metadata of a first page of a plurality of pages corresponding to the target key. In this case, value size data may be included in the metadata of the first page, and the value size data may include information about the size of the whole value before division.

The target key age data may be defined by using key age data corresponding to a page to be erased. The memory controller 2210 may control the memory 2250 so as to erase data stored in a memory area corresponding to the target key age data included in the erase information data. That is, even though memory areas corresponding to the same target key exists, in the case where different target key age data are stored in the respective memory areas, data stored in any one memory area may not be erased.

Figure 7:
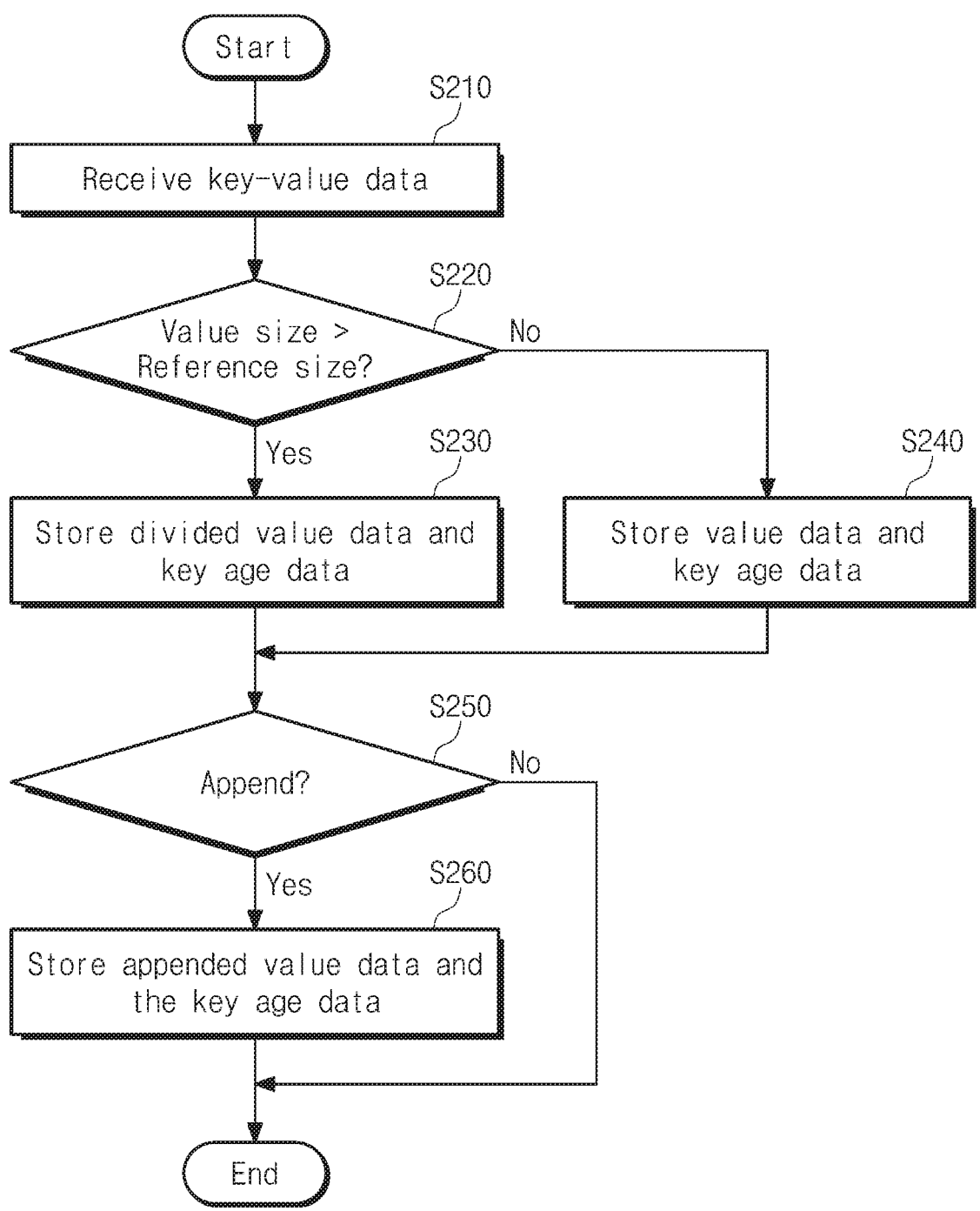
FIG. 7 is a flowchart for describing a write operation in an electronic system of FIG. 1.

FIG. 7 is a flowchart for describing a write operation in an electronic system of FIG. 1. FIG. 7 is a diagram illustrating the process in which the electronic system 100 of FIG. 1 writes key-value data by using key age data. A write operation of FIG. 7 may be performed by using the memory controller 121 of FIG. 1 or the memory controller 1210 of FIG. 4. For convenience of description, FIG. 7 will be described with reference to reference marks of FIG. 1.

In operation S210, the memory controller 121 receives key-value data from the host 110. Also, the memory controller 121 further receives a write command from the host 110. The key-value data may include a key, a value, and metadata. The key-value data may have the format illustrated in FIG. 3, but key age data may not be included in the key-value data.

In operation S220, the memory controller 121 may compare the size of the value and the reference size. The memory controller 121 may determine the value size based on value size data included in the metadata. The reference size may depend on the size of a page included in the memory 125. As described above, the reference size may be set to an upper limit of the size of the value capable of being stored in one page. In the case where the value size is greater than the reference size, operation S230 is performed. In the case where the value size is not greater than the reference size, operation S240 is performed.

In operation S230, the memory controller 121 divides the value and controls the memory 125 such that the divided segments of the value and key age data are stored in the memory 125. In the case where the value size is greater than the reference size, since the value may not be stored in one page, the memory controller 121 may divide the value such that the value is stored in a plurality of pages. The metadata, the key, and the corresponding value segment may be stored in each of a plurality of pages.

In operation S230, the memory controller 121 additionally generates key age data. The key age data are added to the metadata and are stored in each of the plurality of pages. The same key age data may not be stored in the plurality of pages in which the same key is stored. For example, in a memory area allocated based on the same key, key age data corresponding to a memory area where a value is written and key age data corresponding to a memory area where no value is stored may have different data values.

In operation S240, the memory controller 121 adds the key age data to the metadata and controls the memory 125 such that the key-value data, to which the key age data are added, are stored in the memory 125. In the case where the value size is not greater than the reference size, the value may be stored in one page. Accordingly, the value is stored in the memory 125 without the process of dividing the value. As described in operation S230, the same key age data may not be stored in a plurality of memory areas where the same key is stored.

In operation S250, the memory controller 121 may determine whether to write an additional value. The additional value may be determined based on whether there is received a write command for key-value data having the same key as the key received in operation S210, that is, an append command. In the case where the append command is received, operation S260 may be performed; otherwise, the write operation may be terminated.

In operation S260, the memory controller 121 performs a write operation on the appended value. The memory controller 121 adds key age data to metadata corresponding to the appended value and controls the memory 125 such that the key-value data, to which the key age data are added, are stored in the memory 125. In the case where the size of the appended value is greater than the reference size, the appended value may be divided and stored as described in operation S230; in the case where the size of the appended value is not greater than the reference size, the appended value may be stored in one page as described in operation S240. The key age data corresponding to a memory area where the appended value is stored is identical to the key age data corresponding to the memory area where the previous value is stored.

Figure 8:
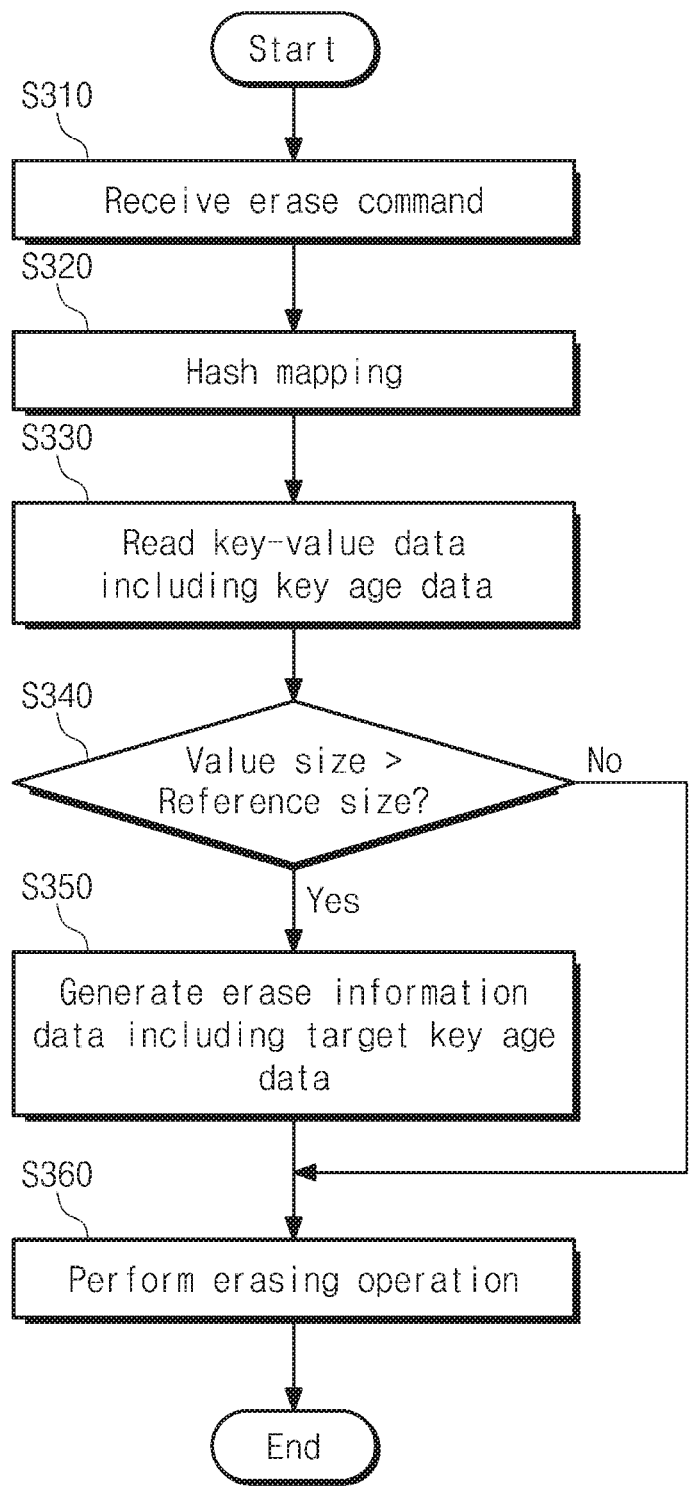
FIG. 8 is a flowchart for describing an erase operation in an electronic system of FIG. 1.

FIG. 8 is a flowchart for describing an erase operation in an electronic system of FIG. 1. FIG. 8 is a diagram illustrating the process in which the electronic system 100 of FIG. 1 erases key-value data stored in the memory 125 by using key age data. Key-value data to be described below has a format including key age data illustrated in FIG. 3. An erase operation of FIG. 8 may be performed by using the memory controller 121 of FIG. 1 or the memory controller 2210 of FIG. 5. For convenience of description, FIG. 8 will be described with reference to reference marks of FIG. 1.

Referring to FIGS. 1 and 8, in operation S310, the memory controller 121 receives an erase command from the host 110. The erase command may be information directing erasing of a value or key-value data corresponding to a target key. The memory controller 121 may further receive the target key from the host 110.

In operation S320, the memory controller 121 may perform a hash operation on the target key to generate target hash data. The memory controller 121 may perform hash mapping based on the target hash data. The memory controller 121 may extract a value address corresponding to the target hash data based on mapping information. Operation S320 may correspond to operation S120 of FIG. 2.

In operation S330, the memory controller 121 reads key-value data based on the extracted value address. The memory controller 121 may read a key and metadata from a memory area corresponding to the extracted value address. The metadata may include key size data, value size data, and key age data. The memory controller 121 may compare the read key and the target key. The memory controller 121 may extract a key having the same data value as the target key.

Between operation S330 and operation S340, the memory controller 121 may transmit a complete message to the host 110. However, the inventive concepts are not limited thereto. For example, the memory controller 121 may transmit the complete message between operation S320 and S330 or between operation S350 and operation S360. It may be understood that each operation after the transmission of the complete message is performed during an idle time.

In operation S340, the memory controller 121 may compare the size of the target value corresponding to the extracted key and the reference size. The memory controller 121 may determine the size of the target value based on the value size data included in the read metadata. In the case where the size of the target value is greater than the reference size, operation S350 is performed. In the case where the size of the target value is not greater than the reference size, operation S360 is performed.

In operation S350, the memory controller 121 generates erase information data. The memory controller 121 may generate the erase information data in the case where the target value is stored in a plurality of pages. The erase information data may include a target key, page range data, and target key age data. The page range data may include page start data and page end data described with reference to FIG. 6.

In operation S360, the memory controller 121 may control the memory 125 such that the target value or the key-value data are erased. In the case where the target value is stored in a plurality of pages, the memory controller 121 may perform an erase operation based on the erase information data. The memory controller 121 may control the memory 125 so as to erase data stored in a memory area corresponding to the target key and the target key age data included in the erase information data. In the case where the size of the target value is not greater than the reference size, since the target value is stored in one page, the memory controller 121 may perform an erase operation without generating separate erase information data.

Figure 9:
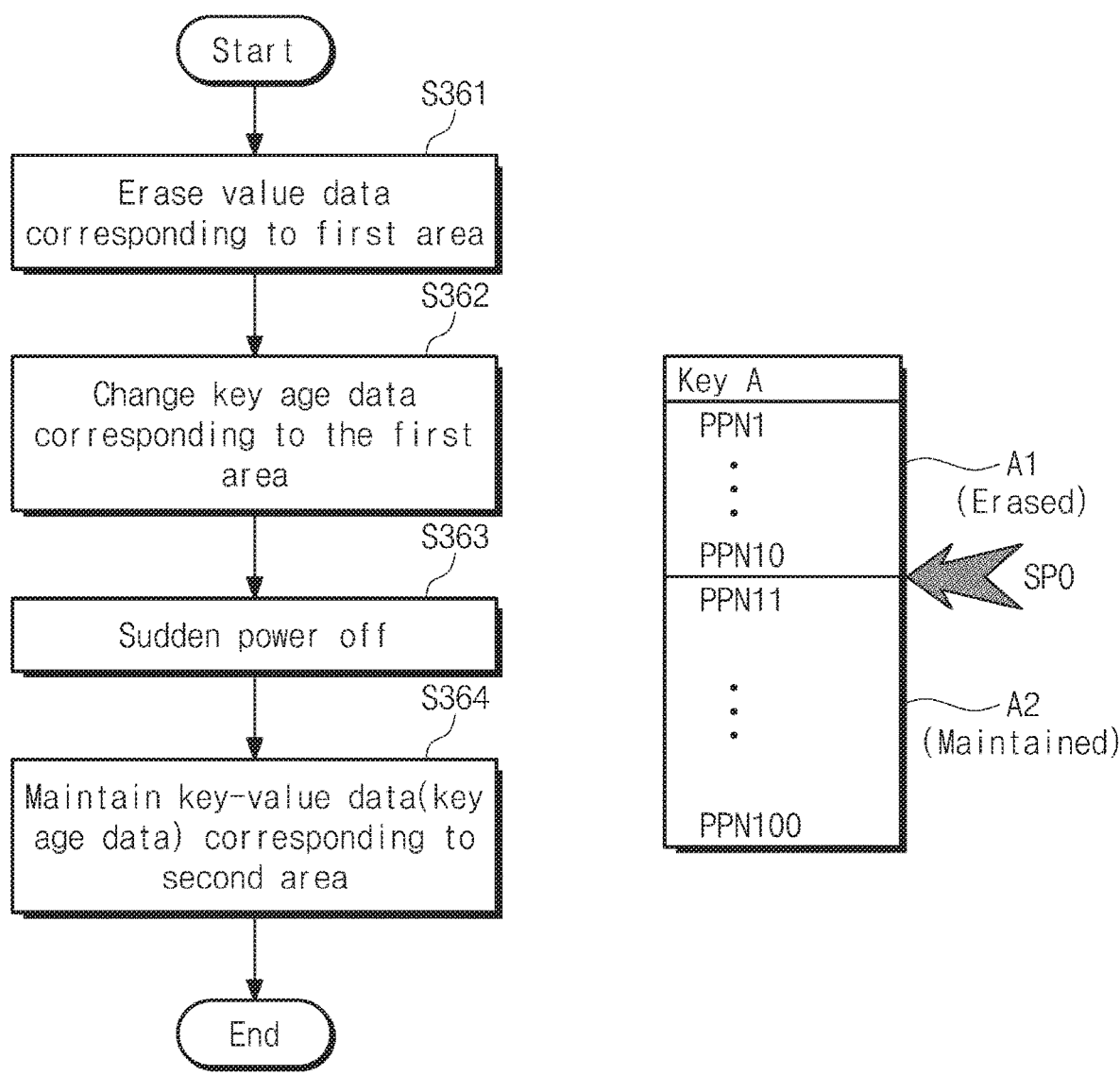
FIG. 9 is a flowchart illustrating operation S360 of FIG. 8.

FIG. 9 is a flowchart illustrating operation S360 of FIG. 8. FIG. 9 is a diagram illustrating the process in which the sudden power-off occurs when an erase operation is performed in operation S360. Here, it may be assumed that a value to be erased is divided and stored in a plurality of pages. For convenience of description, FIG. 9 will be described with reference to reference marks of FIG. 1.

In operation S361, a value corresponding to a first area A1 is erased. The first area A1 may include a plurality of pages. An example in which pages corresponding to first to tenth physical page numbers PPN1 to PPN10 are stored in the first area A1 is illustrated in FIG. 9. In operation S362, key age data corresponding to the first area A1 is changed. That is, key age data corresponding to the first to tenth physical page numbers PPN1 to PPN10 are changed.

In operation S363, the sudden power-off occurs. As the sudden power-off occurs, in operation S364, a value corresponding to a second area A2 may not be erased, and key-value data is maintained. The second area A2 may include a plurality of pages. An example in which pages corresponding to 11th to 100th physical page numbers PPN11 to PPN100 are stored in the second area A2 is illustrated in FIG. 9. The same key is stored in the first area A1 and the second area A2, and the same key age data are stored in the first area A1 and the second area A2 before operation S362. However, in operation S364, key age data corresponding to the first area A1 and key age data corresponding to the second area A2 may have different data values.

To reduce a latency, the memory controller 121 transmits a complete message to the host 110 before data stored in the first and second areas A1 and A2 are actually erased. Accordingly, in the case where the sudden power-off occurs, data stored in the second area A2 may be set by the host 110 as having been erased. To meet these expectations, the electronic system 100 may include a cap (not illustrated) for temporarily storing data when the sudden power-off occurs, and a target key and target key age data may be stored in the cap when the sudden power-off occurs. The key age data corresponding to the actually erased first area A1 is changed, thus having a different data value from the target key age data. For this reason, data corresponding to the second area A2 may be erased at power-on.

Figure 10:
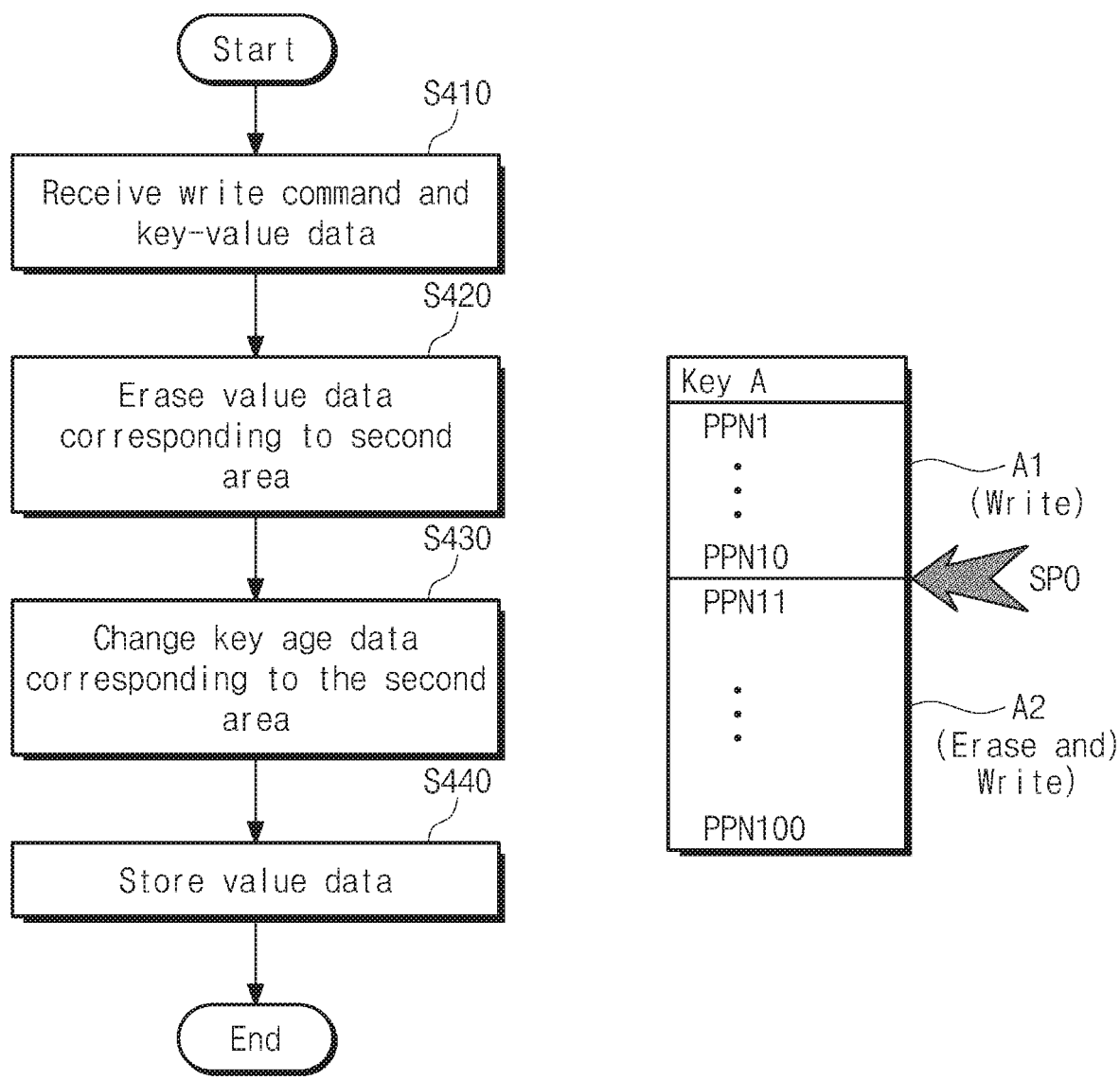
FIG. 10 is a flowchart for describing a write process in the case where a write command is received before an erase operation of a key-value storage device is completed.

FIG. 10 is a flowchart for describing a write process in the case where a write command is received before an erase operation of a key-value storage device is completed. For example, the sudden power-off may occur while an erase operation is performed on the first and second areas A1 and A2 corresponding to a target key. However, since the host 110 has received a complete message, data stored in the second area A2 may be determined by the host 110 as having been erased. In this case, the host 110 may provide a write command for writing key-value data corresponding to a target key to the key-value storage device 120. For convenience of description, FIG. 10 will be described with reference to reference marks of FIG. 1.

Referring to FIGS. 1 and 10, in operation S410, the memory controller 121 receives key-value data from the host 110. Also, the memory controller 121 further receives a write command from the host 110. The key-value data may include a key, a value, and metadata. The key-value data may have the format illustrated in FIG. 3, but key age data may not be included in the key-value data.

In operation S420, the memory controller 121 may erase a value corresponding to the second area A2. Since the NAND flash memory may not support overwrite, data stored in the second area A2 may be erased before a write operation is performed. Since key age data corresponding to the first area A1 and key age data corresponding to the second area A2 are different, an erase operation associated with the second area A2 may be easily performed.

In operation S430, the memory controller 121 changes the key age data corresponding to the second area A2. That is, key age data corresponding to the 11th to 100th physical page numbers PPN11 to PPN100 are changed. Accordingly, the key age data corresponding to the first area A1 and the key age data corresponding to the second area A2 may have the same data value.

In operation S440, a value received together with the write command is stored. The memory controller 121 may add key age data to the key-value data received from the host 110. Here, the added key age data may be generated based on the key age data changed in operation S430. For example, the added key age data may have a value obtained by changing a data value of a portion of key age data corresponding to the first and second areas A1 and A2. Accordingly, in a memory area corresponding to a key, an area where a value is stored and an area where no value is stored may be distinguished.

Figure 11:
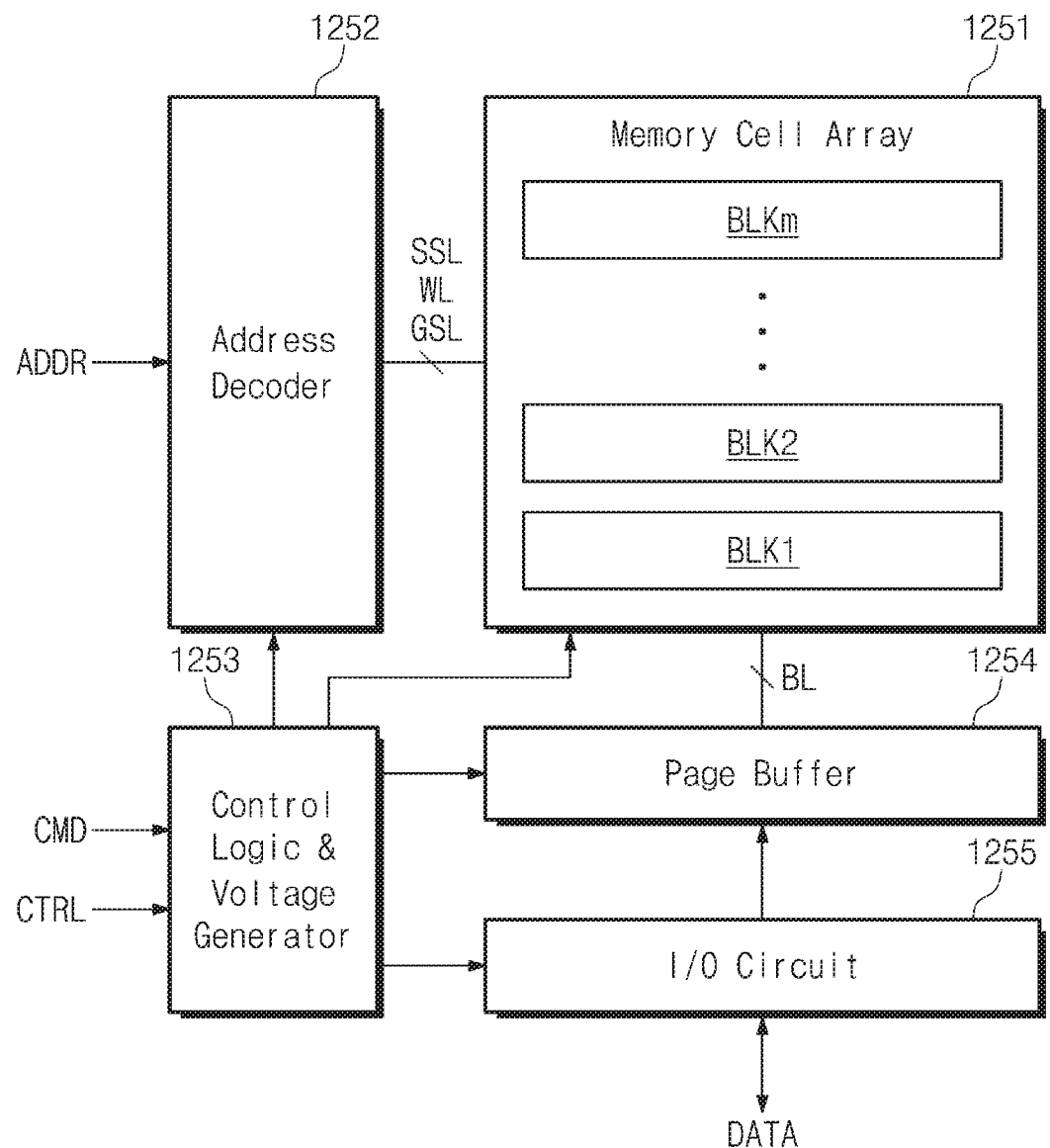
FIG. 11 is a block diagram illustrating a nonvolatile memory device of FIG. 3.

FIG. 11 is a block diagram illustrating a nonvolatile memory device of FIG. 1. The electronic system 100 of FIG. 1 may include nonvolatile memory based storage, that is, a solid state drive (SSD) including a semiconductor flash memory.

Referring to FIG. 11, the nonvolatile memory based storage may include a nonvolatile memory device 1250. The nonvolatile memory device 1250 may correspond to a plurality of nonvolatile memory devices 125_1 to 125_n of FIG. 1. Referring to FIG. 11, the nonvolatile memory device 1250 may include a memory cell array 1251, an address decoder 1252, a control logic and voltage generator 1253, a page buffer 1254, and an input/output circuit 1255.

The memory cell array 1251 may include a plurality of memory blocks BLK1 to BLKm. Each of the memory blocks BLK1 to BLKm may include a plurality of cell strings. Each of the cell strings may include a plurality of memory cells. The memory cells may be connected with a plurality of word lines WL. Each memory cell may be a single level cell (SLC) storing one bit or a multi-level cell (MLC) storing at least two bits. The memory cell array 1251 may include a plurality of memory cells. A three-dimensional memory array may be monolithically formed in one or more physical level(s) of a memory cell array having an active area arranged on a circuit related on a silicon substrate and an operation of memory cells. The circuit associated with an operation of memory cells may be located in a substrate or on the substrate.

The address decoder 1252 may be connected with the memory cell array 1251 through the word lines WL, string selection lines SSL, and ground selection lines GSL. The address decoder 1252 may receive and decode an address ADDR from a memory controller. The address decoder 1252 may select at least one of the word lines WL based on the decoded address and may drive the selected word line.

The control logic and voltage generator 1253 may receive a command CMD and a control signal CTRL from the memory controller 121 of FIG. 1. The control logic and voltage generator 1253 may control the address decoder 1252, the page buffer 1254, and the input/output circuit 1255 in response to the received signals. For example, the control logic and voltage generator 1253 may control the address decoder 1252, the page buffer 1254, and the input/output circuit 1255 in response to the command CMD and the control signal CTRL such that data "DATA", which are provided from the controller 121, such as key-value data are stored in the memory cell array 1251 or such that data, which are stored in the memory cell array 1251, such as key-value data are read.

The control logic and voltage generator 1253 may generate various voltages used to operate the nonvolatile memory device 1250. For example, the control logic and voltage generator 1253 may generate a plurality of program voltages, a plurality of pass voltages, a plurality of selection read voltages, a plurality of non-selection read voltages, a plurality of erase voltages, and a plurality of verification voltages. The control logic and voltage generator 1253 may provide the generated voltages to the address decoder 1252 or to the memory cell array 1251.

The page buffer 1254 may be connected with the memory cell array 1251 through a plurality of bit lines. Under control of the control logic and voltage generator 1253, the page buffer 1254 may control the bit lines BL such that data "DATA" provided from the input/output circuit 1255 are stored in the memory cell array 1251. Under control of the control logic and voltage generator 1253, the page buffer 1254 may read data stored in the memory cell array 1251 and may provide the read data to the input/output circuit 1255. The page buffer 1254 may receive data from the input/output circuit 1255 by the page or may read data from the memory cell array 1251 by the page.

The input/output circuit 1255 may be provided with write data "DATA" from an external device such as a memory controller and may provide the write data "DATA" to the page buffer 1254. Alternatively, the input/output circuit 1255 may be provided with read data "DATA" from the page buffer 1254 and may provide the read data "DATA" to the external device such as a memory controller. For example, the input/output circuit 1255 may exchange data with the external device in synchronization with the control signal CTRL.

According to an example embodiment of the inventive concepts, a key-value storage device and an operating method thereof may perform an erase operation within a uniform latency regardless of the size of a value, and may secure efficiency of an erase operation by using key age data.

According to one or more example embodiments, the units and/or devices described above, such as the components of the key value storage device 120 including the memory controller 121 and the sub-components thereof such as the hash module 122 and header management module 123, may be implemented using hardware, a combination of hardware and software, or a non-transitory storage medium storing software that is executable to perform the functions of the same.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. A key-value storage device comprising:
a nonvolatile memory device configured to store a value, a key, and key age data, the key identifying the value, and the key age data varying based on an erase operation of the value; and
a memory controller configured to,
receive an erase command directing erasing of the value corresponding to the key from a host,
generate hash data in response to the erase command such that a size of the hash data is smaller than a size of the key,
transmit a complete message from the memory controller to the host to inform the host that the memory controller has completed erasing the value prior to the memory controller erasing the value based on the erase command from the host,
access the key and the key age data stored in the nonvolatile memory device based on the hash data,
erase the value based on the key and the key age data during an idle time after transmission of the complete message through a background operation, in response to a size of the value being greater than a reference size, the reference size being based on a page size of the nonvolatile memory device, and
change the key age data corresponding to the key in response to completion of erasing of the value,
wherein the value includes, a first value stored in a first page included in the nonvolatile memory device, and a second value stored in a second page included in the nonvolatile memory device, and wherein the key age data includes, first key age data corresponding to the first value, and second key age data corresponding to the second value, and wherein the memory controller is configured to change the key age data such that, when a power outage occurs while erasing the value, the first value is erased and the second value is not erased, the first key age data and the second key age data have different data values.

2. The key-value storage device of claim 1, wherein the memory controller is configured to generate the hash data based on the key received together with the erase command.

3. The key-value storage device of claim 2, wherein the memory controller is configured to, access the key and the value based on mapping information, and extract a value address corresponding to the hash data based on the mapping information.

4. The key-value storage device of claim 1, wherein the memory controller is configured to read the key and the key age data in response to the erase command.

5. The key-value storage device of claim 1, wherein the memory controller is configured to read the key and the key age data before transmitting the complete message to the host.

6. The key-value storage device of claim 1, wherein the memory controller is configured to, determine whether the size of the value is greater than the reference size, and generate, in response to the size of the value being greater than the reference size, erase information data including page range data corresponding to information of a page storing the value, and the key age data.

7. The key-value storage device of claim 6, wherein the memory controller is configured to, erase the value based on the erase information data.

8. The key-value storage device of claim 1, wherein the first key age data and the second key age data have a same data value.

9. The key-value storage device of claim 1, wherein, the memory controller is configured to erase the second value and change the second key age data during a reboot after the power outage, such that the first key age data and the second key age data have the same data value.

* * * * *